United States Patent [19]
Babbitt et al.

[11] Patent Number: 5,683,810
[45] Date of Patent: *Nov. 4, 1997

[54] POURABLE OR BLOWABLE LOOSE-FILL INSULATION PRODUCT

[75] Inventors: William M. Babbitt, New Albany; Barry L. Shupp, Toledo; George T. Henry, Jr., Newark; Michael E. Evans; John R. Mumaw, both of Granville; Roberta L. Alkire, Millersport; W. Scott Miller; Ronald A. Houpt, both of Newark; Russell M. Potter, Hebron; Tod D. Green, Somerset; David P. Aschenbeck, Newark; Clarke Berdan, II, Granville, all of Ohio

[73] Assignee: Owens-Corning Fiberglas Technology Inc., Summit, Ill.

[*] Notice: The term of this patent shall not extend beyond the expiration date of Pat. No. 5,431,992.

[21] Appl. No.: 619,057

[22] Filed: Mar. 20, 1996

Related U.S. Application Data

[63] Continuation-in-part of Ser. No. 602,478, Feb. 20, 1996, and a continuation of Ser. No. 309,698, Sep. 21, 1994, abandoned, which is a continuation-in-part of Ser. No. 148,098, Nov. 5, 1993, Pat. No. 5,431,992.

[51] Int. Cl.⁶ .................................................... D02G 3/00
[52] U.S. Cl. .................. 428/370; 428/371; 428/378; 428/392
[58] Field of Search ............................ 428/370, 371, 428/378, 392

[56] References Cited

U.S. PATENT DOCUMENTS

| | | |
|---|---|---|
| 2,219,285 | 10/1940 | Allen et al. |
| 2,998,620 | 9/1961 | Stalego . |
| 4,184,643 | 1/1980 | McCort . |
| 4,201,247 | 5/1980 | Shannon . |
| 4,296,164 | 10/1981 | Bemis et al. . |
| 4,347,985 | 9/1982 | Simpson . |
| 4,366,927 | 1/1983 | Kielmeyer . |
| 4,373,005 | 2/1983 | Goodwin . |
| 4,542,044 | 9/1985 | Gano et al. . |
| 4,555,447 | 11/1985 | Sieloff et al. . |
| 4,640,082 | 2/1987 | Gill . |
| 4,682,523 | 7/1987 | Johnson et al. . |
| 4,716,712 | 1/1988 | Gill . |
| 4,756,957 | 7/1988 | Kielmeyer . |
| 4,829,738 | 5/1989 | Moss . |
| 4,842,928 | 6/1989 | Kielmeyer . |
| 4,909,817 | 3/1990 | Gill et al. . |
| 5,035,936 | 7/1991 | Dockrill et al. . |
| 5,367,849 | 11/1994 | Bullock . |
| 5,431,992 | 7/1995 | Houpt et al. ............................ 428/224 |

FOREIGN PATENT DOCUMENTS

| | | |
|---|---|---|
| 9512552 | 5/1995 | WIPO . |
| 9512701 | 5/1995 | WIPO . |

*Primary Examiner*—Christopher Raimund
*Attorney, Agent, or Firm*—C. Michael Gegenheimer; Curtis B. Brueske

[57] ABSTRACT

A loose-fill insulation product is provided which may be poured or blown by a consumer. The insulation is comprised of irregularly-shaped glass fibers which are comprised of two distinct glass compositions. The loose-fill insulation product may be densely packaged in a small container for consumer use, and shows improved recovery, good thermal efficiency, and low dust upon blowing or pouring.

13 Claims, 3 Drawing Sheets

POURABLE OR BLOWABLE LOOSE-FILL INSULATION PRODUCT

This application is a continuation-in-part of the copending application Ser. No. 602,478 entitled LOOSE-FILL INSULATION HAVING IRREGULARLY SHAPED FIBERS, filed Feb. 20, 1996, pending, which is a continuation of Ser. No. 08/309,698, now abandoned, which was a continuation-in-part of Ser. No. 08/148,098, filed Nov. 5, 1993, now U.S. Pat. No. 5,431,992.

BACKGROUND OF THE INVENTION

The present invention relates to a pourable or blowable loose-fill insulation for sidewall and attic installation, and in particular to a loose-fill insulation comprising irregularly-shaped glass fibers which is compressed and packaged in relatively small containers for easier installation by consumers.

In recent years, many homeowners have begun to install extra insulation in their attics or crawlspaces in an effort to save money on heating bills. A common form of insulation used by consumers has been fiberglass insulation batts. However, insulation batts are relatively expensive and may require some cutting and shaping during installation. In addition, conventional fiberglass insulation often requires gloves to handle as the fibers can be irritating to the skin.

More recently, the use of glass fiber blowing wool or loose-fill insulation has increased in popularity. Loose-fill insulation is not formed into a blanket or batt, but rather comprises smaller nodules of traditional, straight, short fibers which are cut from batts, compressed, and packaged into bags. The insulation is installed by adding the loose-fill to the hopper of a pneumatic blower which blows the loose fill insulation into the desired area.

Loose-fill insulation is popular because it can be easily and quickly applied in both new construction as well as in existing structures. Further, loose-fill insulation is a relatively low cost material. However, blowable fiberglass loose-fill insulation is typically applied by contractors rather than homeowners because of the special blowing equipment needed. Such insulation is typically packaged in large bags of 35 lbs.

Further, loose-fill insulation in an unconstrained space, such as an attic, does not prevent the transmission of heat as well as blanket insulation. To compensate for the higher conductivity of loose-fill, it is applied in greater depth than blanket insulation to achieve an equivalent R value.

In addition, after being blown into position, numerous small gaps or voids remain between the blown portions of insulation. These voids create heat convection paths and raise the thermal conductivity of the insulation requiring higher densities to be employed to achieve a specified insulating value.

Cellulose loose-fill insulation is another type of insulation commonly used by consumers, which is formed from shredded, recycled newspapers. Cellulose insulation is desirable for installation by consumers as it is available in smaller packages and is less expensive than most other forms of loose-fill insulation. However, such insulation is dusty, dirty and difficult to blow properly, and also requires special blowing equipment to install.

Accordingly, a need exists for an improved loose-fill insulating material which is pourable or blowable and may be easily applied by a consumer without irritation to the skin. There is a further need in the art for a loose-fill insulating material which may be densely packaged so that it is easy to handle, and which provides good coverage and thermal efficiency.

SUMMARY OF THE INVENTION

These needs are met by the present invention in which an improved pourable or blowable loose-fill insulation is provided. The loose-fill insulation comprises three-dimensional shapes of glass fibers which are irregularly-shaped and have a uniform volume filling nature. Due to the nature of the irregularly-shaped glass fibers, the fibers are capable of being compressed to a much greater density for packaging and still provide adequate recovery and performance properties when installed. Thus, greater quantities of insulation may be packaged in a smaller container, making it easier for homeowners to install the insulation.

According to one aspect of the present invention, a pourable or blowable loose-fill insulation product is provided comprising irregularly shaped glass fibers. The irregularly-shaped fibers are comprised of two distinct glass compositions with different coefficients of thermal expansion. Further, the irregularly-shaped glass fibers are binderless. By "binderless", it is meant that the binder materials comprise less than or equal to 1% by weight of the product. It should be noted that the term "binder" is not meant to include materials added for dust suppression or lubrication.

The irregularly-shaped fibers of the present invention are preferably in the form of nodules. For purposes of the present invention, the term nodules is meant to encompass groups of fibers which have been cut or milled to form three-dimensional shapes having either a uniform or non-uniform configuration, and having dimensions of generally less than about 1 inch. Where the nodules have been cut by a cubing device or a chopping device, the fibers are of a substantially uniform shape and size, while fibers which have been milled tend to form nodules having a more nonuniform shape and size.

The loose-fill insulation product is packaged in a container and compressed at a density of about 8 to 18 pcf (128 to 288 Kg/m$^3$), and more preferably, to a density of about 10 to 15.

The loose-fill insulation product preferably has a thermal conductivity or k value of about 0.22 to 0.57 Btu in/hrft$^{2o}$ F. (0.032 to 0.082 Watt/m°C.) at a density of 0.25 to 3.0 pcf (4 to 48 Kg/m$^3$). Thermal conductivity is a measure of a material's ability to conduct heat.

The loose-fill insulation product preferably has an installed density of about 0.25 to 3.5 pcf.

In a preferred embodiment of the invention, at least a portion of the irregularly-shaped glass fiber surfaces are coated with a dust suppressant, anti-static agent or both. The dust suppressant or anti-static agent may comprise mineral oil, a quaternary ammonium salt or combinations thereof and functions to reduce the dust and static created when the insulation is blown.

The present invention also provides a method of making a pourable or blowable loose-fill insulation product comprising the steps of providing irregularly-shaped glass fibers which are formed from two distinct glass compositions with different coefficients of thermal expansion, cutting or milling the fibers into nodules having a size of from about ¼ inch to 1 inch, collecting the nodules into a container and compressing the nodules to a density of 8 to 18 pcf within the container.

In an alternative method of making the loose-fill insulation product, the irregularly-shaped fibers are formed and then chopped in-line using a chopping device. The fibers are chopped into nodules of about ½ inch, and then collected and compressed in a container to a density of from about 8 to 18 pcf (128 to 288 Kg/m³).

The method of making the loose-fill insulation product may further include the step of applying a dust suppressant or anti-static agent to the surface of the irregularly-shaped fibers after the fibers have been cut, milled or chopped. While the dust suppressant/anti-static agent is preferably applied in this manner, it should be appreciated that it may also be applied to the fibers prior to cutting, milling or chopping.

The resulting loose-fill insulation product of the present invention may be installed by pouring the insulation directly from the container or it may be blown using conventional blowing equipment. When blown in an unconstrained area, the loose-fill insulation may be blown to a density of from about 0.25 to 1.25 pcf (4 to 20 Kg/m³). When blown into a sidewall area, the loose-fill insulation may be blown to a density of from about 1.0 to 3.0 pcf (16.0 to 48.0 Kg/m³). The loose-fill insulation of the present invention has been found to blow much more uniformly into a sidewall than conventional fiberglass products due to the nature of the irregularly-shaped fibers.

The recovery ratio of the insulation after installation is from about 7:1 to 60:1, and more preferably, from about 15:1 to 35:1.

Accordingly, it is a feature of the present invention to provide a pourable or blowable loose-fill insulation which may be compressed to a high density in a container which may be easily handled and installed by consumers. It is a further feature of the present invention to provide a loose-fill insulation product comprised of irregularly-shaped glass fibers having a substantially uniform volume filling nature.

DETAILED DESCRIPTION OF THE INVENTION

The loose-fill insulation product of the present invention provides several advantages over prior art loose-fill insulation products comprised of primarily straight, single-glass fibers which are packaged in large, bulky containers. Such fibers typically are not packaged in smaller containers because the single glass fibers do not recover well upon installation after being subjected to high compression. Further, such fibers are dusty or dirty when blown. The loose-fill insulation of the present invention, on the other hand, is formed of irregularly-shaped fibers which may be compressed to a much greater density than prior art fibers. The irregular nature of the fibers allows them to store energy more efficiently, allowing the fibers to open up or recover fully when installed. Thus, a greater mount of loose-fill insulation may be packaged more densely in smaller containers, which allow convenient handling for consumers.

The smaller packages still provide good coverage, which is a significant advantage over prior art fiberglass loose-fill products which would require many more packages and more handling to achieve the same coverage as the smaller bags of insulation of the present invention.

In addition, the insulation may be poured or blown at an efficient density with low dust. The loose-fill insulation of the present invention has dust levels as low as 0.01 to 0.04 g/1000 Rsf, which is a great deal lower than the dust levels obtained using conventional fiberglass loose-fill products.

Finally, because of the irregular nature of the fibers, the insulation is non-irritating and non-itchy to the skin and may be easily handled by consumers.

Figure 1:
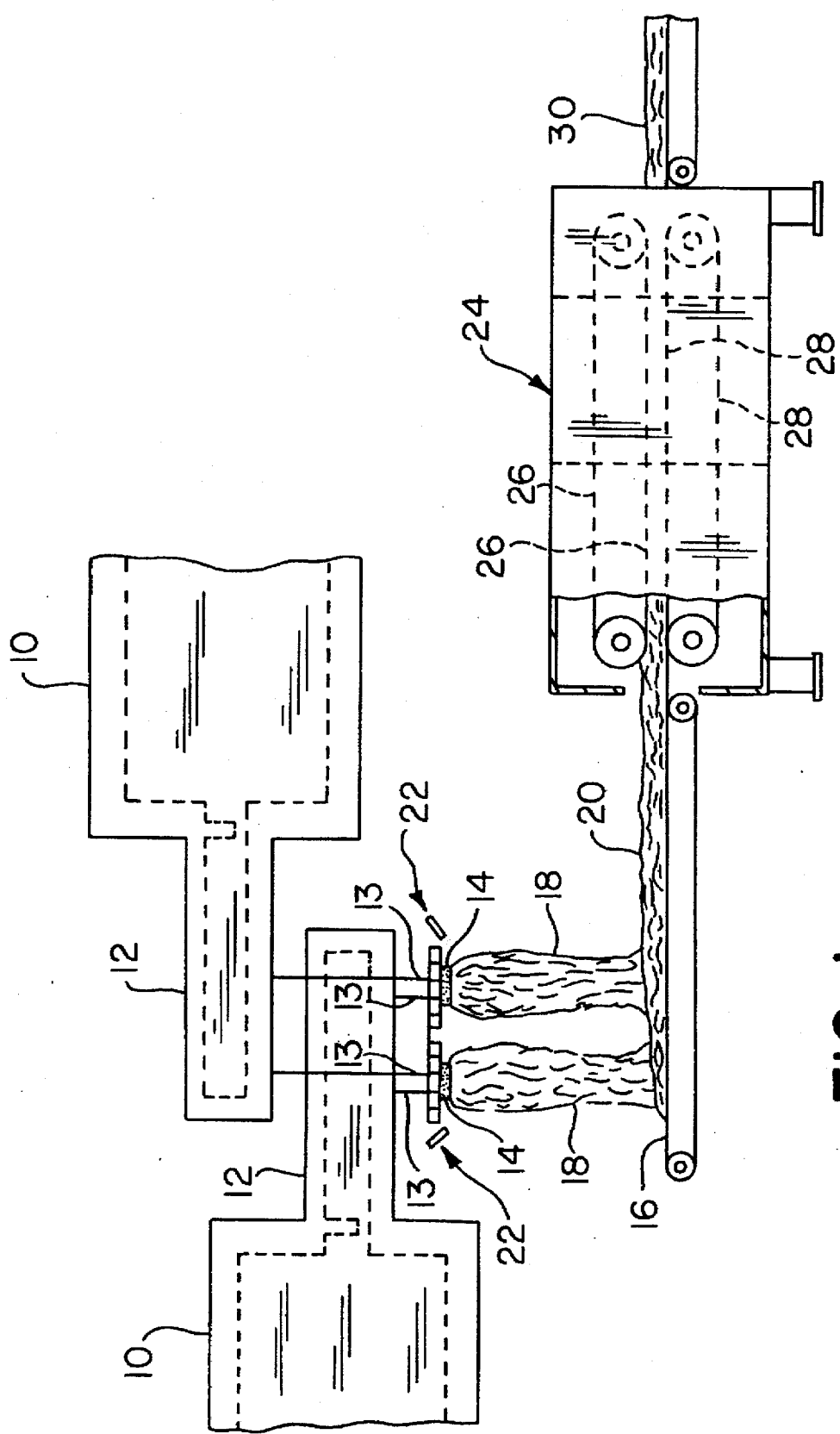
FIG. 1 is a schematic view in elevation of a process by which the insulation of the present invention may be produced.

The irregularly-shaped glass fibers used in the loose-fill insulation of the present invention can be produced from a rotary fiber forming process as shown in FIG. 1. The irregularly-shaped fibers of the present invention are dual-glass fibers, i.e. each fiber is composed of two different glass compositions. Such fibers are disclosed in the U.S. patent application entitled LOOSE-FILL INSULATION HAVING IRREGULARLY SHAPED FIBERS, filed Feb. 20, 1996, and in Houpt et al, U.S. Pat. No. 5,431,992, the disclosures of which are hereby incorporated herein by reference. Such fibers are commercially available from Owens Corning as Miraflex™ fibers.

The dual-glass compositions of the present invention preferably comprise a high-borate, low-soda lime-aluminosilicate composition as one glass and a high soda, low-borate lime-aluminosilicate composition as the other glass, which satisfy all constraints necessary for a successful irregularly-shaped fiber. Other known glass compositions may also be used. A wide range of proportions of the amounts of the two glasses may exist in the various irregularly-shaped glass fibers.

Preferably, the coefficients of thermal expansion of the glasses, as measured on the individual glasses by standard rod techniques, differ by at least 2.0 ppm/°C. The dual-glass fibers have a curvilinear nature due to this difference in thermal expansion coefficients. An irregularly-shaped fiber of the invention differs from a helical fiber in that the rotation of the fiber is not constant, but rather varies irregularly both in direction (clockwise and counter-clockwise) and in magnitude. Thus, each irregularly-shaped fiber is twisted in a unique way. No two fibers are exactly alike. The irregular nature of the fibers allows them to stand apart from one another and achieve a uniform volume filling nature when installed.

Referring now to FIG. 1, it can be seen that streams 13 of two distinct molten glass compositions are supplied from furnaces 10 via forehearths 12 to fiberizers 14. Preferably, the fibers are treated with a lubricant during formation, such as, for example, Emerest™ or Emerlube™, available from Henkel. Veils of irregularly shaped glass fibers 18 produced in fiberizers 14 are then blown downward by means of blowers 22 and collected on a conveyor 16 to form a fibrous blanket 20. As the fibers are blown downward and cool, they assume their irregular shape.

In one method of making the fibers, the blanket 20 is conveyed by conveyor 28 through a heat setting oven 24 where the blanket 20 is shaped and the fibers are fixed in position. Alternatively, the fibers of the present invention may be collected by a direct form method in which the fibers are collected immediately below the fiberizer and shaped and formed into a blanket by opposing conveyors. A suitable direct forming method is disclosed in U.S. patent application Ser. No. 08/240,428 filed May 10, 1994, entitled DIRECT FORMING METHOD OF COLLECTING LONG WOOL FIBERS, by Scott et al, now abandoned, the disclosure of which is hereby incorporated herein by reference.

Figure 2:
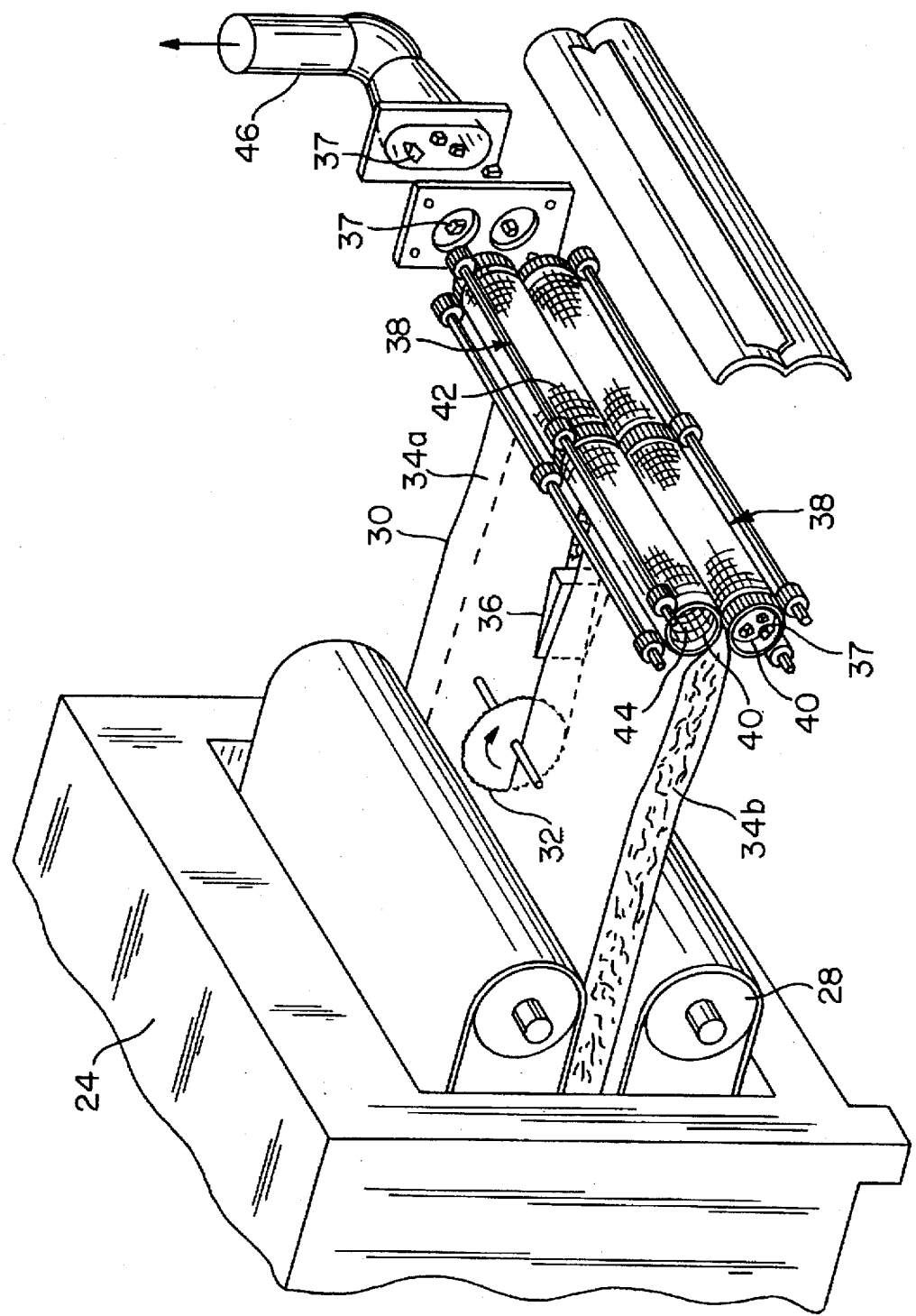
FIG. 2 is schematic view of a cubing device for cutting the loose-fill insulation of the present invention.

As illustrated in FIG. 2, once through the optional oven 24, the shaped blanket 30 may be passed through a rotary saw 32 which splits the blanket into two column segments 34a and 34b and a wedge 36 moves the segments apart before they are fed between a pair of compression rolls (not shown). However, splitting is not required if the blanket is approximately 2' wide or less. The blanket segments 34a and 34b are then fed to identical cutting devices 38. The cutting devices 38 may be hollow cutting cylinders 40 as shown, each perforated with generally square holes 42. In the devices 38, the blanket segments 34a and 34b are cut into nodules 37 having a cubed shape. The nodules 37 preferably have a size of ¼"–1" (0.63 to 2.5 cm) in any of the width, length or height directions.

Figure 3:
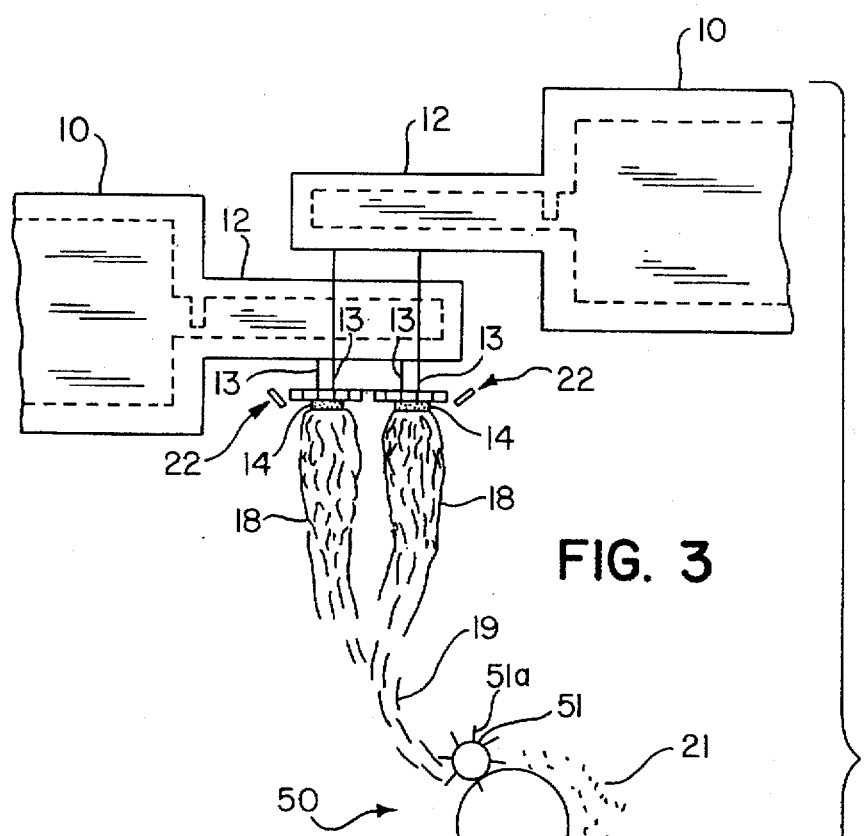
FIG. 3 is a schematic view of a chopping device and bagging device for the loose-fill insulation.

Another more preferred method of forming the fibers is illustrated in FIG. 3 and includes the conventional in-line formation of the irregularly-shaped fibers followed by an in-line chopping process in which the fibers are cut into nodules using a textile-type chopping device 50 which includes a rotating cutter head 51 with a series of blades 51a. The device captures the veil of fibers 18 into a tow 19 and chops the tow into nodules 21. The use of the in-line chopping device eliminates the need to collect the fibers on a conveyor into a bulk pack for cutting as with the above-described conventional processes, thus providing a cost savings.

However, it should be appreciated that while the above-described methods for producing the fibers are preferred, other fabrication techniques may also be employed.

After the fibers are chopped, cubed, or milled, if desired, a portion of the loose-fill insulation may be coated with a dust suppressant/anti-static agent. Preferably, the dust suppressant is a mineral oil, quaternary ammonium salt or combinations thereof. If a quaternary ammonium salt is employed, the dust suppressant/anti-static agent is preferably is a modified fatty dimethyl ethylammonium ethosulfate. Suitable quaternary ammonium salts are disclosed in U.S. Pat. No. 4,555,447 to Sieloff et al, the disclosure of which is hereby incorporated herein by reference. To aid in coating ability, the quaternary ammonium salt may be mixed with a non-ionic lubricant material. A suitable dust suppressant/anti-static agent is available under the tradename MAZON JMR-1 and is available from PPG Industries, Inc. in Pittsburgh, Pa. The dust suppressant/anti-static agent may be applied by traditional means such as dilution with water, followed by spraying onto the cut loose-fill insulation.

As shown in FIG. 3, the nodules 21 are then collected and delivered to a hopper of conventional bagging machinery such as bagging machine 52. Such a machine is disclosed in Bemis, U.S. Pat. No. 4,296,164, the disclosure of which is incorporated herein by reference. As shown, the chopped fibers are collected in a hopper 52a and directed through duct 52b into a bagging chamber 52c. A piston 52d then compresses the fibers into a bag 54 as shown.

It should be appreciated that various other cutting and bagging technologies may also be employed without departing from the scope of the invention. Suitable processes include those disclosed in U.S. Pat. Nos. 4,542,044 and 4,682,523, the disclosures of which are all herein incorporated by reference. Another suitable bagging method is a vacuum bagging process (not shown) in which the fibers are placed in a bag, slits are made in the container, and air in the container is withdrawn through the slits or pores, causing a partial vacuum in the container that results in compression of the fibers. Such a process is disclosed in U.S. Pat. Nos. 4,716,712 and 4,640,082 to Gill, the disclosures of which are incorporated herein by reference.

Figure 4:
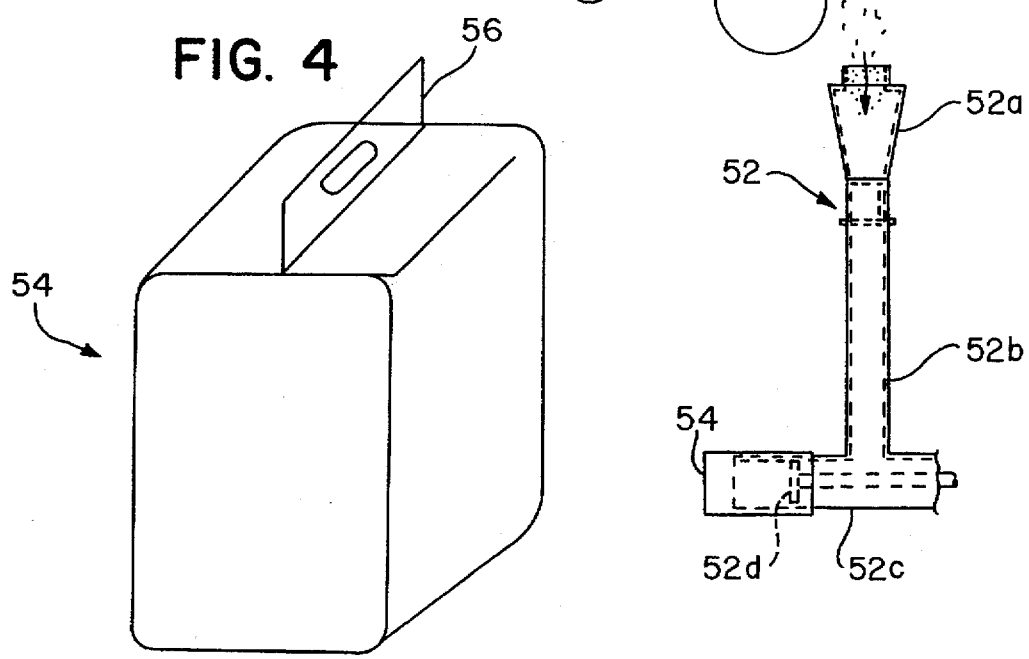
FIG. 4 is a perspective view of a container which may be used to package the loose-fill insulation product of the present invention.

The preferred container for packaging the loose-fill insulation product of the present invention is a bag 54 which may have dimensions of less than about 14"×14"×18" as illustrated in FIG. 4. It should be appreciated that the dimensions of the bag may vary as desired, but should be small enough to fit easily into an attic or crawlspace when installed by pouring. The bag preferably includes a handle 56 for easy carrying by the consumer. The bag may be comprised of any suitable polymer which is flexible and water resistant. A preferred polymer is polyethylene.

Once at the installation site, the loose-fill insulation may be installed by pouring or by blowing. Where the insulation is poured, the package is preferably torn open and raked into the space to be insulated.

Blowing can be performed using any conventional blowing technology known in the art. Typically, the loose-fill insulation is added to the hopper of a standard blowing device and blown into position, thereby expanding and recovering in the process. Another suitable blowing machine for use with the loose-fill insulation of the present invention is the Force II, available from Intec. The machine is more compact and has a lower air volume than conventional blowing machines, and is easier for a consumer to operate. Further, the machine has been found to blow at low dust levels, thereby providing a cleaner method of installation.

Once blown, the insulation provides a uniform volume filling, i.e., the irregular and nonbindered nature of the fibers allows them to spread out and fill the entire volume available to them in a uniform manner.

As mentioned previously, the irregularly-shaped fibers recover from compression to label performance upon installation. The term recovery ratio in the present invention is defined as the ratio of compressed density to recovered density, after an insulation product is compressed to the compressed density, unpackaged, and installed to a desired density. Loose-fill insulation of the present invention may be compressed to a density within the range of about 8 to about 18 pcf (128 to 288 Kg/m$^3$) and is capable of being installed to a density of within the range of about 0.25 to about 3.5 pcf (4 to 56 Kg/m$^3$). This is a recovery ratio within the range of from 15:1 to about 50:1.

Once installed, the loose-fill insulation also exhibits good thermal efficiency. Building insulation products are quantified by their ability to retard heat flow. Resistance to heat flow or R value is the most common measure of an insulation product's ability to retard heat flow from a structure. R-value is defined by the equation: R value=t/k, where R-value is resistance to heat flow in hrft$^2$°F./Btu (m$^2$°C./Watt); t is recovered thickness in inches; and k is thermal conductivity in Btu in/hrft$^2$ °F. (Watt/m°C.).

The loose-fill insulation product of the present invention preferably exhibits a k value of from about 0.22 to 0.57 Btu in/hrft$^2$ F. (0.032 to 0.082 Watt/m°C.) after blowing at a density of from about 0.25 to 3.0 pcf (4 to 48.0 Kg/m$^3$).

In order that the invention may be more readily understood, reference is made to the following examples, which are intended to be illustrative of the invention, but are not intended to be limiting in scope.

EXAMPLE 1

A loose-fill insulation product was produced in accordance with the present invention. Irregularly-shaped fibers (Miraflex™ fibers available from Owens Corning) were produced which contained an in-line lubricant applied at a level of 0.10%. The fibers were chopped in line to form nodules of about ½ inch. The nodules were then bagged using a vacuum bagging system. The bagger used produced 28 ft.$^3$, 200 lb. bags having a package density of approximately 7 pcf.

The loose-fill insulation product was then blown using a Force II blowing machine available from Intec. The material was blown to a density of 0.48 pcf at a blow rate of 7.6 lb/min. with a low dust level of 0.08 gr/35 lb. bag. The dust level was determined using Owens Corning test method D04A.

EXAMPLE 2

Two large bales of Miraflex™ fibers were hand-fed into a mill. The entire amount, which was approximately 400 pounds of loose fibers, was fed into the mill at a feed rate of approximately 70 lbs./min. A dust suppressant/anti-static agent available from PPG Industries, Inc. under the designation MAZON JMR-1 was applied to the fibers at a rate of approximately 0.80% by weight. The fibers were then bagged using the bagging method disclosed in U.S. Pat. No. 4,296,164.

One bag weighing 27.23 lbs. was poured and raked into a test attic to a density of 0.51 pcf. An R30 thickness of 13.5 inches and a thermal efficiency of 0.0188 lb/Rsf was calculated based on an actual pour to a thickness of 8.75 inches.

EXAMPLE 3

Six boxes of Miraflex™ fibers which had not been coated with lubricant were fed into a cubing device and compressed in bags of approximately 25 lbs. using the same bagging method as in Example 2. One bag weighing 27 lbs. was poured and raked into an attic. When poured to a depth of 8.75 inches, the material covered 60 ft.$^2$ at a density of 0.62 pcf.

A number of sidewalls were also blown with the loose-fill insulation. Sidewalls having one side covered with netting blew to densities ranging from 1.34 to 2.54 pcf. Sidewalls having both sides covered with hardboard blew to densities as low as 1.2 pcf and as high as 4.51 pcf.

Having described the invention in detail and by reference to the preferred embodiments thereof, it will be apparent that modifications and variations are possible without departing from the scope of the invention which is defined in the appended claims.

We claim:

1. A pourable or blowable loose-fill insulation product comprising irregularly shaped glass fibers, said irregularly-shaped fibers being comprised of two distinct glass compositions with different coefficients of thermal expansion, said product being packaged in a container and compressed at a density of about 8 to 18 pcf (128 to 288 Kg/m$^3$).

2. The loose-fill insulation product as claimed in claim 1, wherein said irregularly-shaped glass fibers are binderless.

3. The loose-fill insulation product as claimed in claim 1 having a k value of about between about 0.22 to 0.57 Btu in/hrft$^2$°F. (0.032 to 0.082 Watt/m°C.) at a density of between 0.25 to 3.0 pcf (4 to 48.0 Kg/m$^3$).

4. The loose-fill insulation product as claimed in claim 1 having an installed density of about 0.25 to 3.5 pcf.

5. The loose-fill insulation product as claimed in claim 1 having a dust level of from about 0.01 to 0.04 g/1000 Rsf.

6. The loose-fill insulation product as claimed in claim 1 wherein at least a portion of said irregularly-shaped glass fiber surfaces are coated with a dust suppressant, anti-static agent or both.

7. The loose-fill insulation product as claimed in claim 6 wherein said dust suppressant or anti-static agent is mineral oil, a quaternary ammonium salt or combinations thereof.

8. The loose-fill insulation product as claimed in claim 1 having a recovery ratio from 7:1 to 60:1.

9. A method of making a pourable or blowable loose-fill insulation product comprising the steps of:

providing irregularly-shaped glass fibers which are formed from two distinct glass compositions with different coefficients of thermal expansion;

cutting or milling said fibers into nodules having a size of from ¼ inch to 1 inch; and collecting said nodules into a container and compressing said nodules to a density of 8 to 18 pcf (128 to 288 Kg/m$^3$) within said container.

10. The method of claim 9 including the step of coating said fibers with a dust suppressant, anti-static agent, or both after said cutting step.

11. The method of claim 9 including the step of blowing said insulation with a blowing device to a density of between about 0.25 and 3.5 pcf.

12. The method of claim 9 including the step of pouring said insulation to a density of between about 0.25 to 2.0 pcf.

13. A method of making a pourable or blowable loose-fill insulation product comprising the steps of:

providing irregularly-shaped glass fibers which are formed from two distinct glass compositions with different coefficients of thermal expansion;

chopping said fibers in-line with a chopping device to form nodules having a size of about ½ inch; and collecting said nodules into a container and compressing said pieces to a density of from about 8 to 18 pcf (128 to 288 Kg/m$^3$) within said container.

\* \* \* \* \*